United States Patent
Kim et al.

(10) Patent No.: US 10,146,868 B2
(45) Date of Patent: Dec. 4, 2018

(54) AUTOMATED DETECTION AND FILTERING OF AUDIO ADVERTISEMENTS

(71) Applicant: AT&T INTELLECTUAL PROPERTY I, L.P., Atlanta, GA (US)

(72) Inventors: Yeon-Jun Kim, Whippany, NJ (US); I. Dan Melamed, New York, NY (US); Bernard S. Renger, New Providence, NJ (US); Steven Neil Tischer, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/617,256

(22) Filed: Jun. 8, 2017

(65) Prior Publication Data

US 2017/0270201 A1    Sep. 21, 2017

Related U.S. Application Data

(63) Continuation of application No. 14/865,979, filed on Sep. 25, 2015, now Pat. No. 9,703,865, which is a (Continued)

(51) Int. Cl.
*G10L 25/48* (2013.01)
*G10L 25/78* (2013.01)
(Continued)

(52) U.S. Cl.
CPC ........ *G06F 17/30761* (2013.01); *G06F 17/00* (2013.01); *G10L 15/083* (2013.01);
(Continued)

(58) Field of Classification Search
CPC ......... G10L 25/48; G10L 25/78; G10L 25/87; G06F 17/00
See application file for complete search history.

(56) References Cited

U.S. PATENT DOCUMENTS 5,579,431 A * 11/1996 Reaves ................... G10L 25/78
                                                                    704/214
5,727,121 A *  3/1998 Chiba .................... G10L 25/78
                                                                    704/208

(Continued)

OTHER PUBLICATIONS

Covell et al., "Advertising Detection and Replacement Using Acoustic and Visual Repetition", IEEE 8th Workshop on Mulimedia Signal Processing, Oct. 2006.

*Primary Examiner* — Samuel G Neway
(74) *Attorney, Agent, or Firm* — Greenblum & Bernstein, P.L.C.

(57) ABSTRACT

Apparatuses, systems, methods, and media for filtering a data stream are provided. The data stream is partitioned into a plurality of data stream segments. An acoustic parameter is measured in each of the data stream segments. It is determined whether the acoustic parameter satisfies a first predetermined condition. The first predetermined condition includes a number of variances, in which the acoustic parameter exceeds a predetermined variance threshold, exceeding a predetermined number threshold. An extraneous portion of the data stream is identified in which the first predetermined condition is satisfied. It is determined whether the extraneous portion satisfies a second predetermined condition in the data stream. The extraneous portion is deleted from the data stream to produce a filtered data stream in response to the second predetermined condition being satisfied.

20 Claims, 9 Drawing Sheets

Related U.S. Application Data continuation of application No. 13/867,264, filed on Apr. 22, 2013, now Pat. No. 9,183,177, which is a continuation of application No. 12/634,981, filed on Dec. 10, 2009, now Pat. No. 8,457,771.

(51) Int. Cl.

| | | |
|---|---|---|
| *G10L 25/87* | (2013.01) | |
| *G06F 17/00* | (2006.01) | |
| *G06F 17/30* | (2006.01) | |
| *G10L 15/08* | (2006.01) | |
| *G10L 25/90* | (2013.01) | |

(52) U.S. Cl.
CPC .............. *G10L 25/48* (2013.01); *G10L 25/78* (2013.01); *G10L 25/87* (2013.01); *G10L 25/90* (2013.01)

(56) References Cited

U.S. PATENT DOCUMENTS

| | | | | |
|---|---|---|---|---|
| 5,870,397 | A * | 2/1999 | Chauffour | G10L 19/012 370/435 |
| 6,078,882 | A * | 6/2000 | Sato | G10L 19/012 704/226 |
| 6,615,039 | B1 * | 9/2003 | Eldering | H04N 7/165 348/E7.063 |
| 6,801,895 | B1 * | 10/2004 | Huang | G10L 25/48 348/468 |
| 6,885,986 | B1 | 4/2005 | Gigi | |
| 6,993,245 | B1 * | 1/2006 | Harville | H04N 5/76 348/E7.061 |
| 7,260,439 | B2 * | 8/2007 | Foote | G11B 27/28 700/94 |
| 7,299,173 | B2 * | 11/2007 | Ma | G10L 25/78 704/215 |
| 7,490,053 | B1 * | 2/2009 | Emerson, III | G06Q 30/0264 705/14.61 |
| 7,899,390 | B1 * | 3/2011 | Littlejohn | H04H 20/103 379/101.01 |
| 8,457,771 | B2 * | 6/2013 | Kim | G10L 25/48 700/94 |
| 8,606,585 | B2 | 12/2013 | Melamed et al. | |
| 9,183,177 | B2 * | 11/2015 | Kim | G10L 25/48 |
| 9,703,865 | B2 * | 7/2017 | Kim | G10L 25/48 |
| 2003/0023972 | A1 * | 1/2003 | Gutta | H04N 7/163 725/34 |
| 2003/0112265 | A1 * | 6/2003 | Zhang | G06F 17/30787 715/723 |
| 2004/0001161 | A1 * | 1/2004 | Herley | H04H 60/37 348/465 |
| 2005/0169114 | A1 * | 8/2005 | Ahn | G10H 1/0041 369/7 |
| 2005/0222901 | A1 * | 10/2005 | Agarwal | G06F 17/3061 705/14.54 |
| 2006/0277567 | A1 * | 12/2006 | Kinnear | H04H 20/106 725/34 |
| 2008/0292273 | A1 * | 11/2008 | Wang | H04N 5/76 386/249 |
| 2009/0005890 | A1 * | 1/2009 | Zhang | G06F 17/30743 700/94 |
| 2009/0088878 | A1 * | 4/2009 | Otsuka | G10H 1/00 700/94 |
| 2009/0133092 | A1 * | 5/2009 | Casagrande | G11B 27/105 725/137 |
| 2009/0254933 | A1 * | 10/2009 | Gupta | H04H 20/14 725/14 |
| 2010/0111312 | A1 * | 5/2010 | Duxans Barrobes | H04H 60/375 381/56 |
| 2010/0319015 | A1 * | 12/2010 | Remington | H04H 20/10 725/19 |
| 2011/0145001 | A1 * | 6/2011 | Kim | G10L 25/48 704/278 |
| 2011/0145002 | A1 * | 6/2011 | Melamed | G10L 25/48 704/278 |
| 2013/0268103 | A1 * | 10/2013 | Kim | G10L 25/48 700/94 |
| 2017/0270201 | A1 * | 9/2017 | Kim | G10L 25/48 |

\* cited by examiner

FIG. 9

| Method | Precision | Recall | $F_1$ |
|---|---|---|---|
| Baseline Method | .62 | .43 | .37 |
| Exemplary Pitch Dynamics Method | .75 | .82 | .70 |

.# AUTOMATED DETECTION AND FILTERING OF AUDIO ADVERTISEMENTS

CROSS REFERENCE TO RELATED APPLICATIONS

The present application is a continuation application of U.S. patent application Ser. No. 14/865,979, filed on Sep. 25, 2015, which is a continuation application of U.S. patent application Ser. No. 13/867,264, filed on Apr. 22, 2013 and now U.S. Pat. No. 9,183,177, which is a continuation application of U.S. patent application Ser. No. 12/634,981, filed on Dec. 10, 2009 and now U.S. Pat. No. 8,457,771. The disclosure of each of these documents, including the specification, drawings, and claims, is incorporated herein by reference in its entirety.

BACKGROUND

1. Field of the Disclosure

The present disclosure relates to filtering a data stream. More particularly, the present disclosure relates to a method for detecting and filtering advertisements from an audio stream.

2. Background Information

The customer service call centers of many companies record their calls for quality control purposes. As part of their efforts, quality analysts use voice search systems to search call transcripts for words or phrases that were spoken by customers and/or customer service agents. When a service call is recorded, it is stored on a media server for future playback. It is also transcribed by automatic speech recognition software. The transcript is then indexed for searching. Thereafter, a quality analyst performs searches on this index, to retrieve a list of calls that satisfy various criteria, such as calls that include specific words or phrases. The analyst can then retrieve those calls from the media server and analyze them for quality control purposes.

BRIEF DESCRIPTION OF THE DRAWINGS

FIG. 9 is a table of the results of filtering audio streams according to a baseline method versus filtering the audio streams according to an exemplary embodiment of the present application.

DETAILED DESCRIPTION

Figure 1:
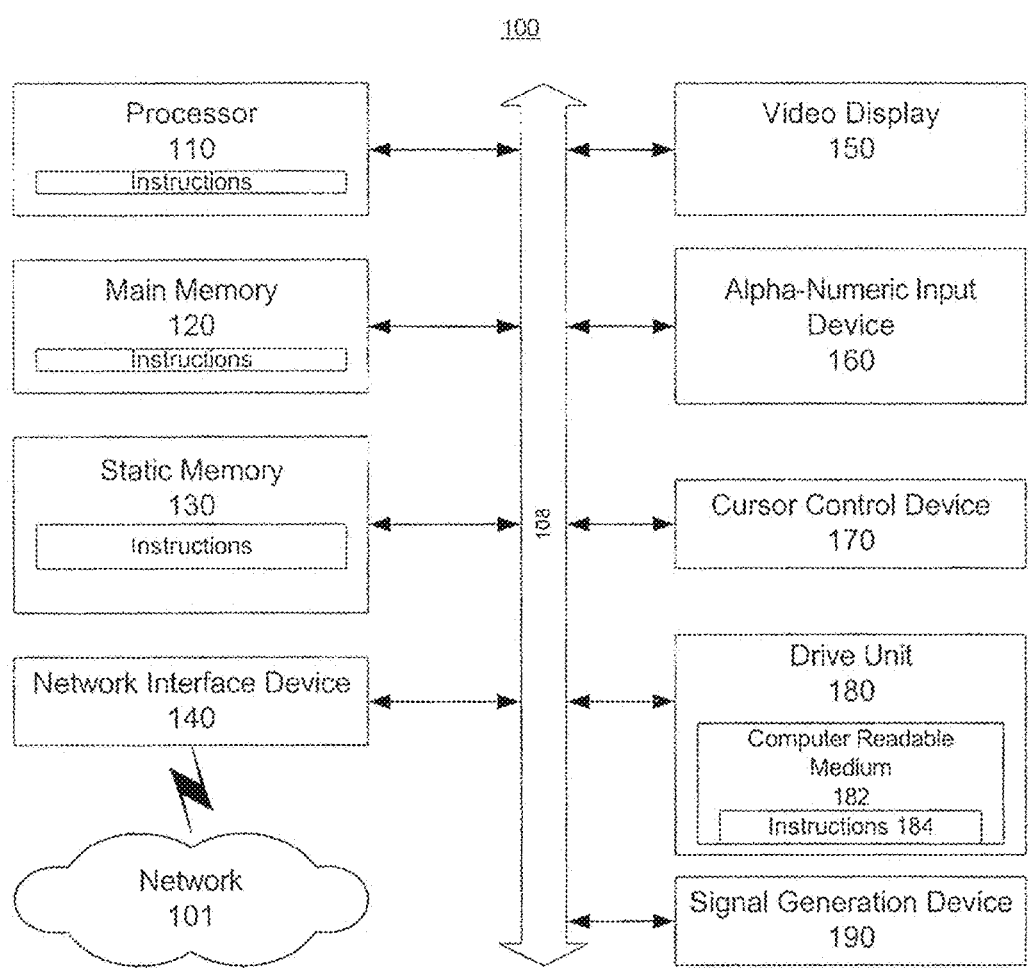
FIG. 1 shows an exemplary general computer system that includes a set of instructions for filtering a data stream.

In view of the foregoing, the present disclosure, through one or more of its various aspects, embodiments and/or specific features or sub-components, is thus intended to bring out one or more of the advantages as specifically noted below.

According to an embodiment of the present disclosure, a method for filtering a data stream includes analyzing the data stream based on an acoustic parameter to determine whether a predetermined condition is satisfied, determining at least one extraneous portion of the data stream in which the predetermined condition is satisfied, and deleting the at least one extraneous portion from the data stream to produce a filtered data stream.

According to one aspect of the present disclosure, the method further includes segmenting the data stream into a plurality of data stream segments. According to such an aspect, each of the data stream segments is analyzed, based on the acoustic parameter, to determine whether the predetermined condition is satisfied, and each of the at least one extraneous portion comprises a plurality of consecutive data stream segments in which the predetermined condition is satisfied.

According to another aspect of the present disclosure, the predetermined condition is whether a variance of the acoustic parameter in a data stream segment exceeds a predetermined variance threshold.

According to yet another aspect of the present disclosure, the predetermined condition is whether a number of variances, of the acoustic parameter in a data stream segment that exceed a predetermined variance threshold, exceeds a predetermined number threshold.

According to still another aspect of the present disclosure, the at least one extraneous portion is deleted from the data stream only in response to a duration of the at least one extraneous portion exceeding a predetermined minimum extraneous duration.

According to an additional aspect of the present disclosure, the at least one extraneous portion is further defined as two extraneous portions, the two extraneous portions are separated by a non-extraneous portion in which the predetermined condition is not satisfied, and the method further includes deleting the non-extraneous portion from the data stream in response to a duration of the non-extraneous portion being less than a predetermined minimum non-extraneous duration.

According to another aspect of the present disclosure, the at least one extraneous portion is further defined as two extraneous portions, the two extraneous portions are separated by a non-extraneous portion in which the predetermined condition is not satisfied, the method further includes determining one of the two extraneous portions to be an erroneous extraneous portion, and the filtered data stream comprises the erroneous extraneous portion and the non-extraneous portion.

According to yet another aspect of the present disclosure, the one of the two extraneous portions that is determined to be the erroneous extraneous portion has a duration that is shorter than a duration of another of the two extraneous portions.

According to still another aspect of the present disclosure, the data stream is unknown before analyzing the data stream.

According to an additional aspect of the present disclosure, information of the data stream is known before analyzing the data stream, and the acoustic parameter and the predetermined condition are based on the information that is known of the data stream.

According to another aspect of the present disclosure, the data stream includes speech of an individual, the information comprises an acoustic model of the individual, and the acoustic parameter and the predetermined condition are based on the acoustic model of the individual.

According to yet another aspect of the present disclosure, the method further includes pre-analyzing at least a portion of the data stream to manually determine the at least one extraneous portion of the data stream, and determining at least one of the acoustic parameter and the predetermined condition based on the pre-analyzing of the at least one portion of the data stream.

According to still another aspect of the present disclosure, the method further includes post-analyzing the extraneous portion and the filtered data stream to determine an accuracy of the filtered data stream, and modifying at least one of the acoustic parameter and the predetermined condition based on the post-analyzing to improve the accuracy of the filtered data stream.

According to an additional aspect of the present disclosure, the data stream comprises post-production segments and pre-production segments, the post-production segments including post-production attributes, and the predetermined condition is whether the data stream includes the post-production attributes.

According to another aspect of the present disclosure, the method further includes replacing the deleted at least one extraneous portion with an alternative portion.

According to yet another aspect of the present disclosure, the data stream is an audio stream and the at least one extraneous portion is an advertisement.

According to another embodiment of the present disclosure, an apparatus for filtering a data stream includes a segmenter that segments the data stream into a plurality of data stream segments, an analyzer that analyzes each of the data stream segments based on an acoustic parameter to determine whether a predetermined condition is satisfied, a determiner that determines at least one extraneous portion of the data stream, each of the at least one extraneous portion comprising a plurality of consecutive data stream segments in which the predetermined condition is determined to be satisfied, and a deleter that deletes the at least one extraneous portion from the data stream to produce a filtered data stream.

According to one aspect of the present disclosure, the data stream is an audio stream and the at least one extraneous portion is an advertisement.

According to another aspect of the present disclosure, the data stream is received by a telecommunications device via a telecommunications network, and the deleter deletes the at least one extraneous portion before the telecommunications device broadcasts the at least one extraneous portion.

According to another embodiment of the present disclosure, a tangible computer-readable medium encoded with an executable computer program for filtering a data stream includes a segmenting code segment that segments the data stream into a plurality of data stream segments, a data analyzing code segment that analyzes each of the data stream segments based on an acoustic parameter to determine whether a predetermined condition is satisfied, an extraneous portion determining code segment that determines at least one extraneous portion of the data stream, each of the at least one extraneous portion comprising a plurality of consecutive data stream segments in which the predetermined condition is determined to be satisfied, and a deleting code segment that deletes the at least one extraneous portion from the data stream to produce a filtered data stream.

FIG. 1 is an illustrative embodiment of a general computer system, on which a method to provide automated detection and filtering of at least one extraneous portion of a data stream, such as an audio advertisement, can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal so that a device connected to a network 101 can communicate voice, video or data over the network 101. Further, the instructions 184 may be transmitted or received over the network 101 via the network interface device 140.

Figure 2:
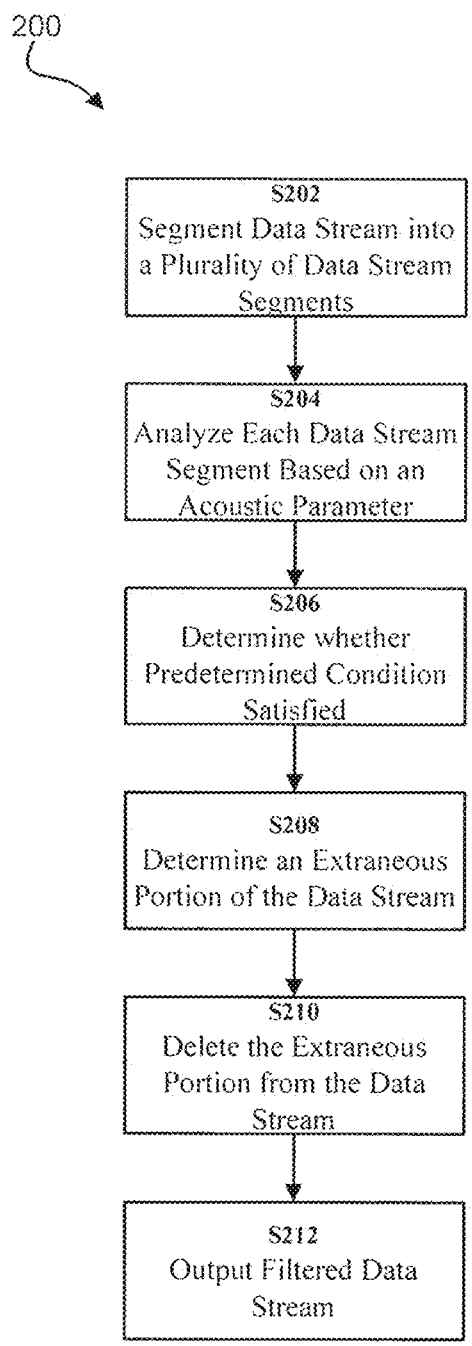
FIG. 2 is a flowchart of an embodiment of a method for filtering a data stream, according to an aspect of the present disclosure.

A method for filtering a data stream 200 is generally shown in FIG. 2. In an exemplary and non-limiting embodiment of the method 200, the data stream is a customer service call center recording, and advertisements are filtered from the customer service call center recording. In additional embodiments of the method 200, those skilled in the art appreciate that additional data streams, such as, but not limited to, video data streams, may also be filtered. Furthermore, those skilled in the art appreciate that the data stream may be filtered to remove extraneous or unwanted data stream segments in addition to, or alternatively to, advertisements.

According to the embodiment of the method 200 as shown in FIG. 2, the data stream is segmented into a plurality of data stream segments at S202. In an embodiment of the method 200, the data stream is segmented into a plurality of data streams segments that each has a fixed duration. For example, in an exemplary embodiment of the method 200, each data stream segment has a duration of 10 ms. Of course, those skilled in the art appreciate that the data stream segments may have a different duration in alternative embodiments of the method 200. Furthermore, those skilled in the art appreciate that, in even further embodiments, the data streams segments may have variable durations. That is, different data stream segments may have different durations.

Each of the data stream segments is analyzed based on an acoustic parameter at S204. The acoustic parameter may be pitch, stress, emphasis, tone, accent, frequency, or any other acoustic parameter generally known in the art. For example, in the non-limiting and exemplary embodiment of the present application in which advertisements are detected in a customer service call center recording, the acoustic parameter may be pitch variance. Of course, those skilled in the art appreciate that additional and/or alternative acoustic parameters may also be used in additional embodiments of the method 200. In the embodiment of the method 200 as shown in FIG. 2, each data stream segment is analyzed based on a single acoustic parameter. However, in additional embodiments of the method 200, each data stream segment may be analyzed based on a plurality of acoustic parameters or based on different acoustic parameters.

For each data stream segment that is analyzed based on the acoustic parameter, it is determined whether a predetermined condition is satisfied at S206. The predetermined condition may be any condition generally understood in the art, such as, but not limited to, whether the predetermined condition exceeds a certain threshold, whether a variance of the predetermined condition exceeds a certain threshold, and whether a frequency of variances that exceed a certain threshold exceeds a certain frequency. For example, in exemplary embodiments of the method 200 wherein the acoustic parameter is pitch, the predetermined condition may be whether the maximum pitch variance or whether the average pitch variance of a data stream segment exceeds a predetermined pitch threshold. In an alternative embodiment of the method 200, the predetermined condition may be whether the number of variances, in which the pitch variance exceeds a predetermined pitch variance threshold, exceeds a predetermined pitch number threshold. Of course, those skilled in the art appreciate that the embodiments as described above are to be considered merely exemplary and are not intended to be limiting.

In the method 200, at least one extraneous portion of the data stream in which the predetermined condition is satisfied is determined at S208. The extraneous portion may be a single data stream segment in which the predetermined condition is determined to be satisfied, or, alternatively, the extraneous portion may comprise a plurality of consecutive data stream segments in which the predetermined condition is determined to be satisfied. In the exemplary and non-limiting embodiment of the method 200 in which the data stream is a customer service call center recording, the extraneous portion may be an advertisement. Of course, those skilled in the art appreciate that in additional embodiments of the method 200 the extraneous portion may be an alternative extraneous portion, such as, but not limited to, a client monologue or a customer service agent monologue.

According to the method 200, the at least one extraneous portion of the data stream is deleted from the data stream to produce a filtered data stream at S210, and the filtered data stream is output to a device, such as, but not limited to, a recorder or a player at S212. In an embodiment of the method 200, the deleted extraneous portion may be replaced with an alternative portion. For example, in the non-limiting and exemplary embodiment of the present application in which advertisements are detected in a customer service call center recording, a deleted advertisement may be replaced with an alternative advertisement, music, or silence.

According to an embodiment of the method 200, the data stream may be unknown before analyzing and filtering the data stream. In this regard, the acoustic parameter and the predetermined condition may be set without being based on known information of the data stream. For example, in the non-limiting and exemplary embodiment of the present application in which advertisements are detected in a customer service call center recording, the advertisements and the content of the customer service call center recording may be unknown to a quality control analyst that analyzes the customer service call center recording, and the quality control analyst may set the acoustic parameter and the predetermined condition without having any knowledge of the advertisements and the content of the customer service call.

In an alternative embodiment of the method 200, information of the data stream may be known before analyzing and filtering the data stream. According to such an embodiment, at least one of the acoustic parameter and the predetermined condition are based on the information that is known of the data stream. For example, in the non-limiting and exemplary embodiment of the present application in which advertisements are detected in a customer service call center recording, information of the content of the customer service call center recording may be known. The known information may then be used to distinguish the content of the customer service call center recording from the advertisements. For example, if an acoustic model of the customer service agent that is speaking in the customer service call center recording is known, then the acoustic parameter and the predetermined condition may be based on the acoustic model of the customer service agent. Of course, those skilled in the art appreciate that the embodiments as described above are to be considered merely exemplary and are not intended to be limiting.

In an additional embodiment of the non-limiting and exemplary embodiment of the present application in which advertisements are detected in a customer service call center recording, information of the advertisements may be known, and at least one of the acoustic parameter and the predetermined condition may be based on the information that is known of the advertisements. For example, if it is known that the advertisements comprise post-production segments while the segments of the customer service call center recording comprise pre-production segments, then the predetermined condition may be whether a data stream segment includes post-production attributes.

Figure 3:
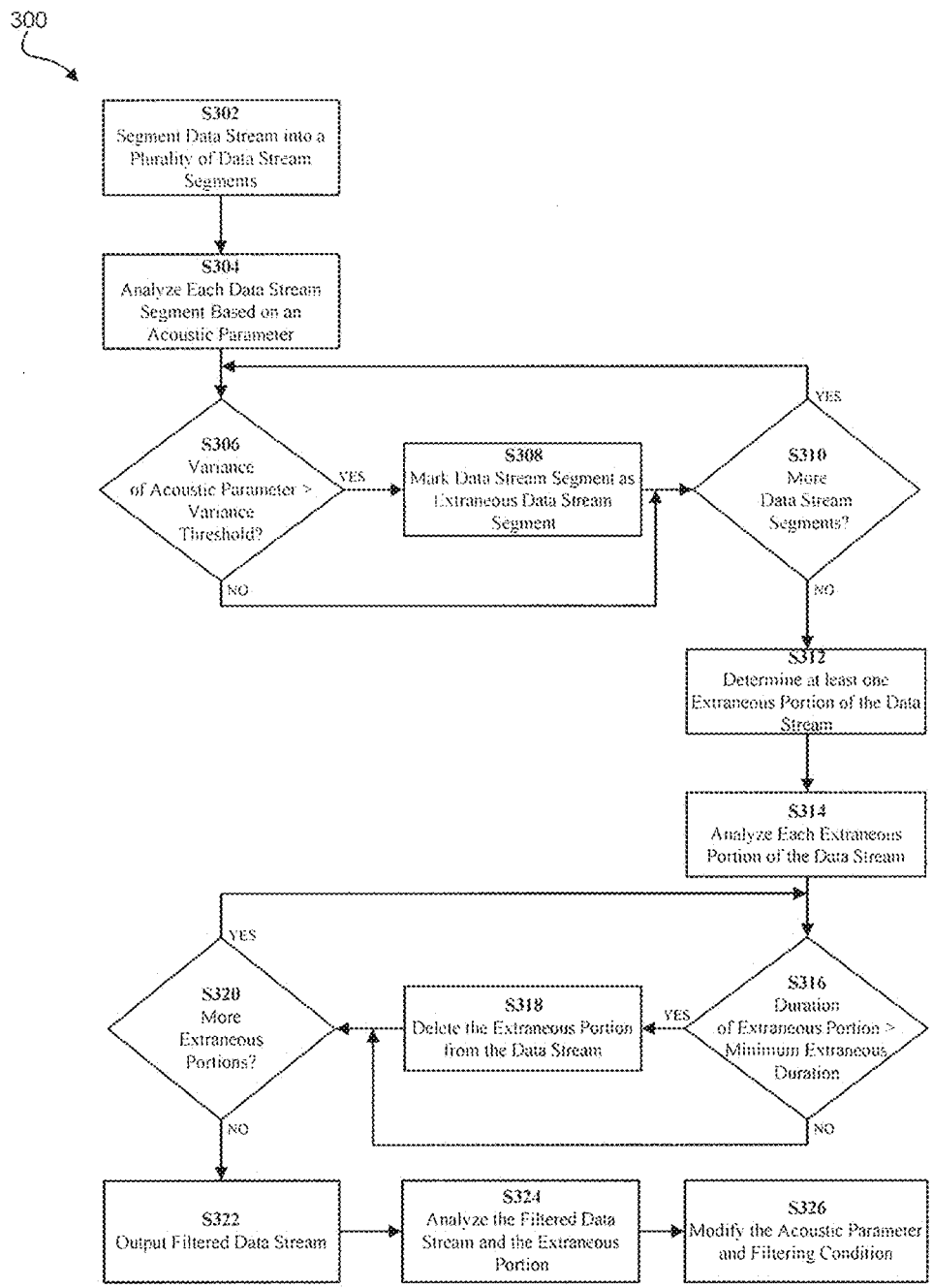
FIG. 3 is a flowchart of an embodiment of a method for filtering a data stream, according to another aspect of the present disclosure.

A further embodiment of a method for filtering a data stream is generally shown in FIG. 3. In the method 300 as shown in FIG. 3, the data stream is segmented into a plurality of data stream segments at S302. Each of the data stream segments is analyzed based on an acoustic parameter at S304. According to the method 300, each of the data stream segments is analyzed to determine whether a variance of the acoustic parameter throughout the data stream segment is greater than a predetermined variance threshold at S306. For example, if the acoustic parameter is pitch, then each data stream segment is analyzed to determine whether the average pitch variance throughout each data stream segment exceeds a predetermined variance threshold.

If it is determined that the variance of the acoustic parameter throughout one of the data stream segments is greater than the predetermined variance threshold, then that data stream segment is marked as an extraneous data stream segment at S308. Thereafter, it is determined whether there are additional data stream segments to be analyzed at S310. If there are no additional data stream segments to be analyzed, than at least one extraneous portion of the data stream is determined at S312, wherein each extraneous portion of the data stream comprises consecutive data stream segments in which the variance of the acoustic parameter throughout each data stream segment is greater than the predetermined variance threshold.

Each extraneous portion of the data stream is analyzed at S314. In this regard, in the embodiment of the method 300 shown in FIG. 3, each extraneous portion of the data stream is analyzed to determine whether a duration of the extraneous portion exceeds a minimum extraneous duration at S316. If the duration of the extraneous portion exceeds the minimum extraneous duration, then the extraneous portion is deleted from the data stream at S318. According to the method 300, if the duration of the extraneous portion does not exceed the minimum extraneous duration, then the extraneous portion is not deleted from the data stream. In other words, in the non-limiting and exemplary embodiment of the present application in which advertisements are detected in a customer service call center recording, if an advertisement is detected that has a duration that is less than a predetermined duration, then the advertisement is determined to not constitute an advertisement and is not deleted from the customer service call center recording.

After each extraneous portion of the data stream is analyzed to determine whether the duration of the extraneous portion exceeds the minimum extraneous duration, it is determined whether there are additional extraneous portions at S320. If it is determined that there are no additional extraneous portions of the data stream, then the data stream is output as a filtered data stream to a device such as, but not limited to, a player or a recorder at S322.

In the embodiment of the method 300 as shown in FIG. 3, the filtered data stream and the extraneous portions of the data stream are post-analyzed to determine an accuracy of the filtered data stream at S324. In this regard, in an embodiment of the method 300, only the deleted extraneous portions of the data stream are post-analyzed. However, in another embodiment of the method 300, both the deleted extraneous portions and the non-deleted extraneous portions are post-analyzed. Furthermore, in an even further embodiment of the method 300, only the non-deleted extraneous portions are post-analyzed.

As shown in the method 300, after the filtered data stream and the extraneous portions of the data stream are post-analyzed to determine an accuracy of the filtered data stream, the acoustic parameter and the predetermined filtering condition, such as the filtering condition of determining whether a variance of the acoustic parameter in a data stream segment exceeds a variance threshold, are modified to improve the accuracy of the filtered data stream. In an alternative embodiment of the method 300, only one of the acoustic parameter and the predetermined filtering condition is modified to improve the accuracy of the filtered data stream. For example, in a non-limiting and exemplary embodiment of the method 300, the variance threshold is modified based on the post-analyzing the filtered data stream and the extraneous portions to improve the accuracy of the filtered data stream. Of course, those skilled in the art appreciate that the embodiment as described above is to be considered merely exemplary and is not intended to be limiting.

Figure 4:
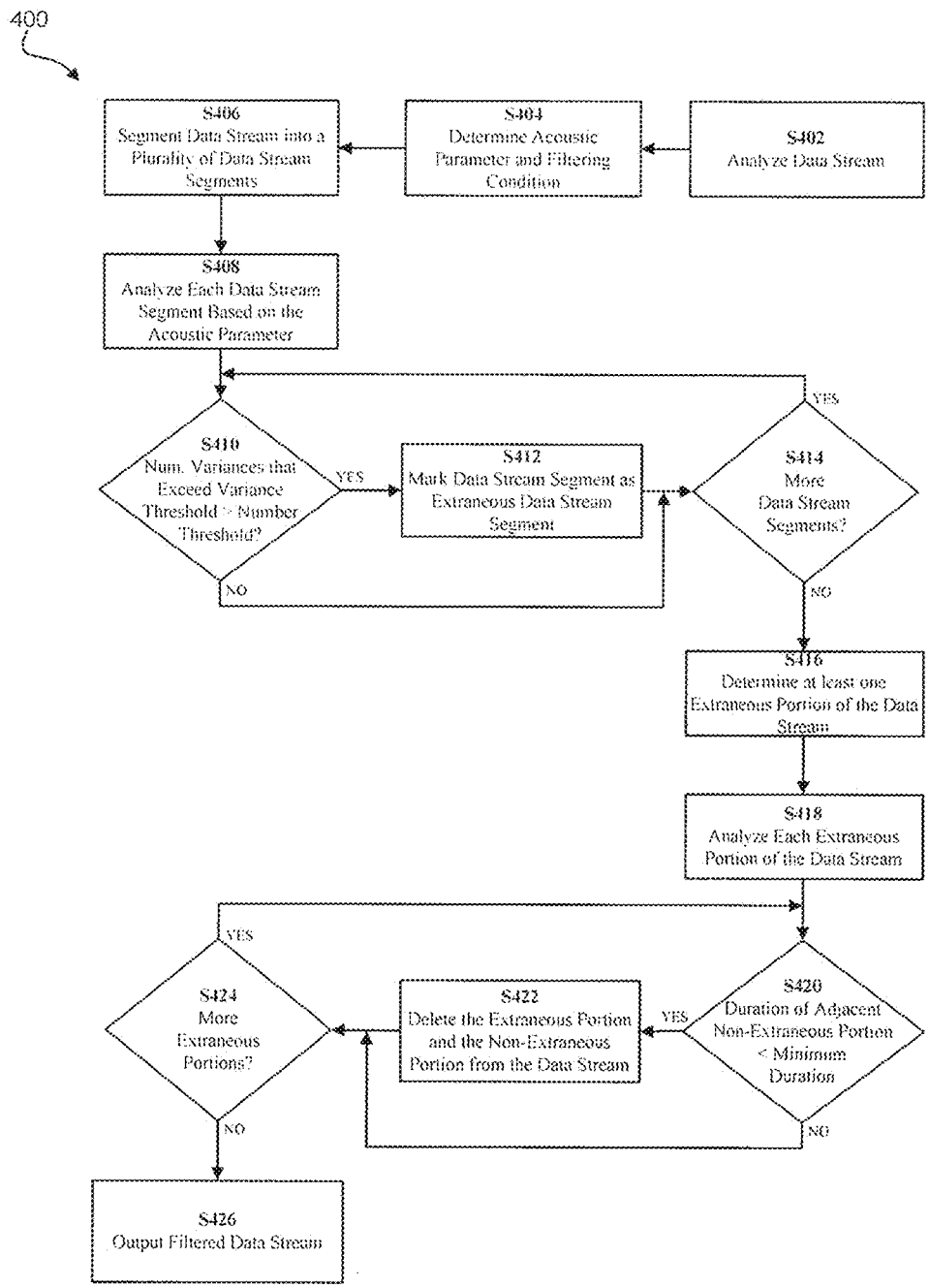
FIG. 4 is a flowchart of an embodiment of a method for filtering a data stream, according to yet another aspect of the present disclosure.

An additional embodiment of a method for filtering a data stream is generally shown in FIG. 4. In the method 400 as shown in FIG. 4, the data stream is pre-analyzed to manually determine at least one extraneous portion of the data stream at S402. Thereafter, at least one of an acoustic parameter and a predetermined condition is determined based on the pre-analyzing at S404.

Thereafter, in the method 400 as shown in FIG. 4, the data stream is segmented into a plurality of data stream segments at S406. Each of the data stream segments is analyzed based on the acoustic parameter at S408. According to the method 400, each of the data stream segments is analyzed to determine whether the predetermined condition is satisfied at S410. In the method 400, the predetermined condition is whether a number of variances, of the acoustic parameter in a data stream segment that exceeds a predetermined variance threshold, exceeds a predetermined number threshold. Of course, those skilled in the art appreciate that, in additional embodiments of the method 400, additional and/or alternative predetermined conditions may also be used.

If it is determined that the number of variances exceeds the predetermined number threshold, then that data stream segment is marked as an extraneous data stream segment at S412. Thereafter, it is determined whether there are additional data stream segments to be analyzed at S414. If there are no additional data stream segments to be analyzed, than at least one extraneous portion of the data stream is determined at S416, wherein each extraneous portion of the data stream comprises consecutive extraneous data stream segments.

Each extraneous portion of the data stream is analyzed at S418. In this regard, in an embodiment of the present application as shown in FIG. 4, each extraneous portion of the data stream is analyzed to determine whether the extraneous portion of the data stream is separated from another extraneous portion of the data stream by a non-extraneous portion, wherein the non-extraneous portion has a duration that is less than a minimum non-extraneous duration, at S420. If the extraneous portion of the data stream is determined to be separated from another extraneous portion of the data stream from a non-extraneous portion that has a duration that is less than a minimum non-extraneous duration, then the extraneous portion and the non-extraneous portion of the data stream are deleted from the data stream at S422. In other words, in the non-limiting and exemplary embodiment of the present application in which advertisements are detected in a customer service call center recording, when an advertisement is separated from another advertisement by a non-advertisement, if it is determined that the non-advertisement has a duration that is shorter than a predetermined duration, then the non-advertisement is determined to be an advertisement and is deleted from the customer service call center recording.

After each extraneous portion of the data stream is analyzed to determine whether a duration of an adjacent non-extraneous portion is less than a minimum non-extraneous duration, it is determined whether there are additional extraneous portions at S424. If it is determined that there are no additional extraneous portions of the data stream, then the data stream is output as a filtered data stream to a device such as, but not limited to, a player or a recorder at S426.

Figure 5:
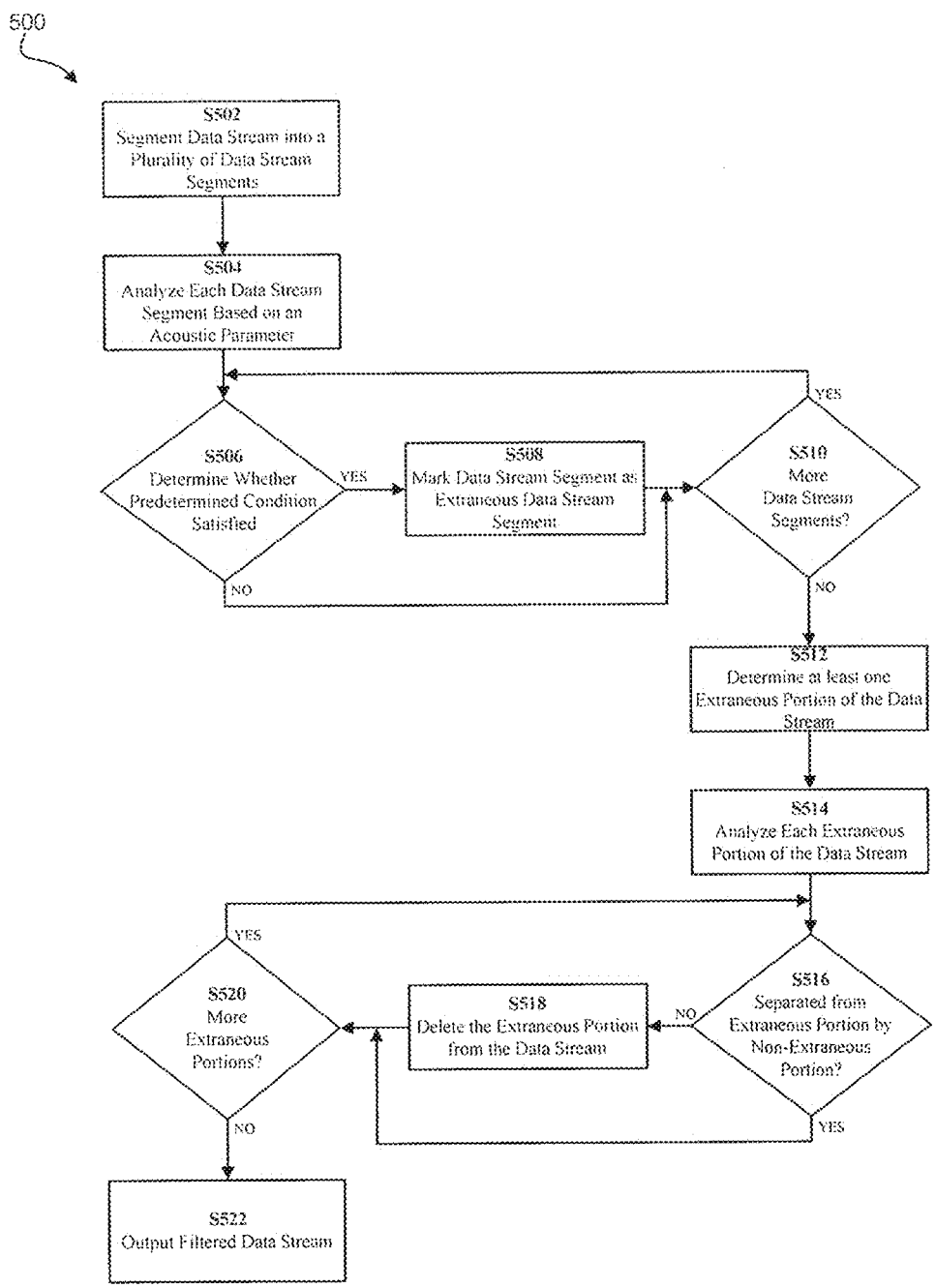
FIG. 5 is a flowchart of an embodiment of a method for filtering a data stream, according to still another aspect of the present disclosure.

A further embodiment of a method for filtering a data stream is generally shown in FIG. 5. In the method 500 as shown in FIG. 5, the data stream is segmented into a plurality of data stream segments at S502. Each of the data stream segments is analyzed based on an acoustic parameter at S504 to determine whether a predetermined condition is satisfied at S506.

If it is determined that the predetermined condition is satisfied, then that data stream segment is marked as an extraneous data stream segment at S508. Thereafter, it is determined whether there are additional data stream segments to be analyzed at S510. If there are no additional data stream segments to be analyzed, than at least one extraneous portion of the data stream is determined at S512, wherein each extraneous portion of the data stream comprises consecutive data stream segments in which the predetermined condition is satisfied.

Each extraneous portion of the data stream is analyzed at S514. In this regard, in the embodiment of the method 500 shown in FIG. 5, each extraneous portion of the data stream is analyzed to determine whether the extraneous portion of the data stream is separated from another extraneous portion of the data stream by a non-extraneous portion of the data stream in which the predetermined condition is not satisfied at S516. If it is determined that the extraneous portion is separated from another extraneous portion by a non-extraneous portion, then one of the extraneous portions is determined to be an erroneous extraneous portion at S516. In an embodiment of the method 500, the one of the two extraneous portions that are separated by the non-extraneous portion that has a duration that is shorter than a duration of the other of the two extraneous portions is determined to be the erroneous extraneous portion. Of course, those skilled in the art appreciation that additional methods may also be used to determined the erroneous extraneous portion.

As shown in FIG. 5, the extraneous portion that is determined to be the erroneous extraneous portion is not deleted from the data stream while the extraneous portion that is not determined to be the erroneous extraneous portion is deleted from the data stream at S518. In this regard, in the non-limiting and exemplary embodiment of the present application in which advertisements are detected in a customer service call center recording, when it is determined that an advertisement is separated from an advertisement by a non-advertisement, the advertisement that has the shortest duration is determined to be an erroneous advertisement, and the erroneous advertisement is not deleted from the customer service call center recording. Of course, those skilled in the art appreciate that the embodiment as described above is to be considered merely exemplary and is not intended to be limiting.

After each extraneous portion of the data stream is analyzed to determine whether the extraneous portion is an erroneous extraneous portion, it is determined whether there are additional extraneous portions at S520. If it is determined that there are no additional extraneous portions of the data stream, then the data stream is output as a filtered data stream to a device such as, but not limited to, a player or a recorder at S522.

Figure 6:
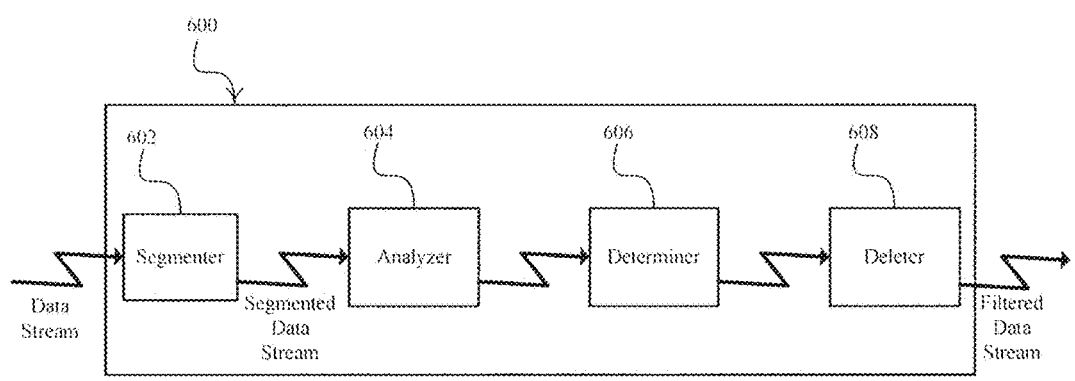
FIG. 6 is a schematic of an apparatus for filtering a data stream, according to an aspect of the present disclosure.

In a further embodiment of the present disclosure, as generally indicated in FIG. 6, an apparatus 600 for filtering a data stream is provided. The apparatus 600 includes a segmenter 602 that receives the data stream and that segments the data stream into a plurality of data stream segments. An analyzer 604 analyzes each of the data stream segments based on an acoustic parameter to determine whether a predetermined condition is satisfied. A determiner 606 determines at least one extraneous portion of the data stream, wherein the at least one extraneous portion comprises a plurality of consecutive data stream segments in which the predetermined condition is determined to be satisfied. A deleter 608 deletes the at least one extraneous portion from the data stream to produce a filtered data stream.

According to an embodiment of the apparatus 600, the data stream is an audio stream and the at least one extraneous portion is an advertisement.

According to a further embodiment, the data stream is received by a telecommunications device via a telecommunications network and the deleter 608 deletes the at least one extraneous portion before the telecommunications device broadcasts the at least one extraneous portion. For example, in a non-limiting and exemplary embodiment of the apparatus 600, a telecommunications device may receive a voice mail message via the telecommunications network. The segmenter 602 segments the voice mail message into a plurality of data stream segments, and the analyzer analyzes each of the data stream segments based on an acoustic parameter, such as, but not limited to, pitch variance, to determine if a predetermined condition is satisfied. Thereafter, a determiner determines at least one extraneous portion of the data stream, such as, but not limited to, an advertisement in the voice mail message, wherein the advertisement comprises a plurality of consecutive data stream segments in which the predetermined condition was determined to be satisfied. The deleter 608 deletes the advertisement from the voice mail message before the telecommunications device broadcasts the advertisement.

The present disclosure also provides a tangible computer-readable medium encoded with an executable computer program for filtering a data stream. The tangible computer-readable medium includes a segmenting code segment that segments the data stream into a plurality of data stream segments. A data analyzing code segment analyzes each of the data stream segments based on an acoustic parameter to determine whether a predetermined condition is satisfied. Thereafter, an extraneous portion determining code segment determines at least one extraneous portion of the data stream based on the analyzed data stream segments, wherein each of the at least one extraneous portion comprises a plurality of consecutive data stream segments in which the predetermined condition is determined to be satisfied. A deleting code segment deletes the at least one extraneous portion from the data stream to produce a filtered data stream.

Accordingly, the present invention enables extraneous, or unwanted, portions of a data stream to be filtered from the data stream. In a non-limiting and exemplary embodiment of the present application, quality control analysts in customer service call centers often search for keywords in call transcripts. Their searches often return a large number of false positives when the search terms also appear in advertisements that customers hear while they are on hold. In this regard, the present invention provides a method, apparatus, and computer-readable medium for filtering the advertisements from the call transcripts, thereby eliminating the return of the large number of false positives.

Figure 7:
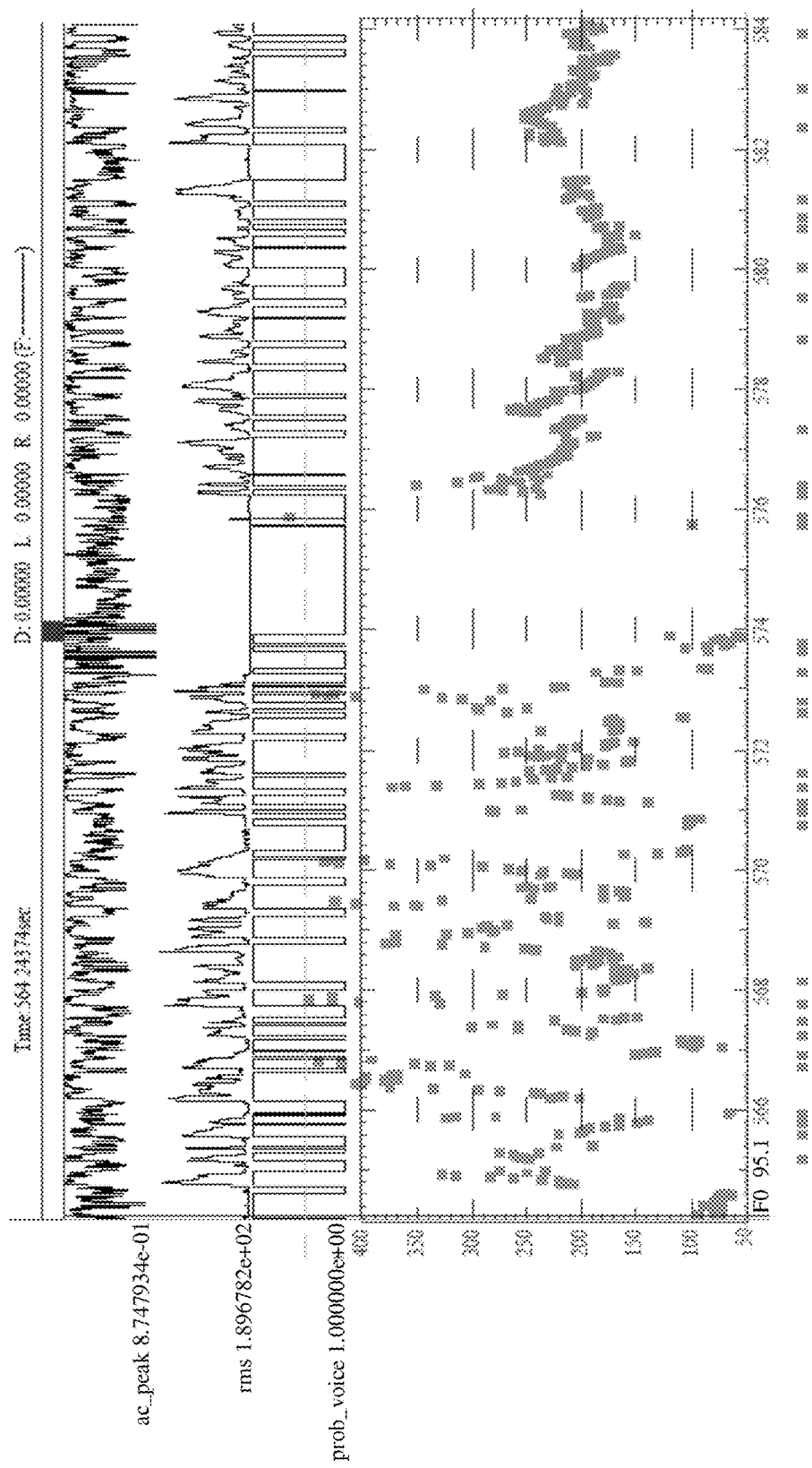
FIG. 7 is a graph of the fundamental frequency of an exemplary call recording that includes advertisements.

In a non-limiting and exemplary embodiment of the present application it is relied on the fact that, in an effort to increase a listener's attention, voices in audio advertisements generally tend to vary their pitch more rapidly than voices in other kinds of speech. The difference is illustrated in the lower graph of FIG. 7. FIG. 7 shows the f0 contour over time, sampled in frames of 10 ms. The rapidly varying values between frames 564 and 574 are the tail segment of an advertisement. The values from frame 576 onwards are from the voice of a customer service agent. The exemplary embodiment focuses on this distinguishing characteristic.

In the exemplary embodiment, three parameters may be optimized on training data: the minimum pitch variance $v_{min}$; the minimum gap length $g_{min}$; and the minimum advertisement length $l_{min}$. These parameters may then be used in the following procedure.

First, measure the fundamental frequency (f0) in every 10 ms frame of the call recording. Although the f0 contour is generally known to be difficult to model, it is relatively stable in the face of background noise, as long as the voice of interest remains the dominant signal. For example, many advertisements are accompanied by soft background music. In the exemplary embodiment, the auto-correlation based pitch extractor get_f0 from the ESPS/Waves toolkit may be used. However, those skilled in the art appreciate that alternative methods may also be used.

Second, filter out f0 values that are outside the typical range for human voices. Such values can arise as artifacts of the pitch extraction algorithm.

Third, compute the change in the fundamental frequency (f0') between every two adjacent frames.

Fourth, find monotonic sequences of f0' values that are longer than 50 ms.

Fifth, partition the call into snippets of one second each and, in each snippet (S), compute the following measure of pitch variance:

$$v_S = \max_{t \in S, n > 5} \left| \sum_{i=0}^{n} \frac{\delta F0(t+i)}{n} \delta F0(t+i) \right| \quad (1)$$

where t ranges over 10 ms time frames in the snippet. In other words, the pitch variance of each one-second snippet is measured as the maximum absolute slope of f0 values spanning at least 50 ms. For every snippet S where $v_S > v_{min}$, the snippet is labeled as an advertisement snippet; the remaining snippets are labeled as non-advertisement snippets.

Sixth, fill in the gaps. If two advertisement snippets i and k are less than $g_{min}$ seconds apart, then label every snippet j, where i<j<k; as an advertisement snippet.

Seventh, impose a minimum advertisement length. For every contiguous sequence of advertisement snippets (i, . . . , j), where neither i−1 nor j+1 are advertisement snippets, if $j-i < l_{min}$, then re-label snippets (i, . . . , j) as non-advertisement snippets.

Eighth, output the remaining advertisement snippets.

In the exemplary embodiment of the present application, simulated annealing, as described by S. Kirkpatrick, C. D. Gelatt, and M. P. Vecchi, "Optimization by simulated annealing," *Science*, col. 22 220, no. 4598, pp. 671-680, 1983, may be used to optimize the three parameters. However, those skilled in the art appreciate that alternative procedures may also be used.

Figure 8:
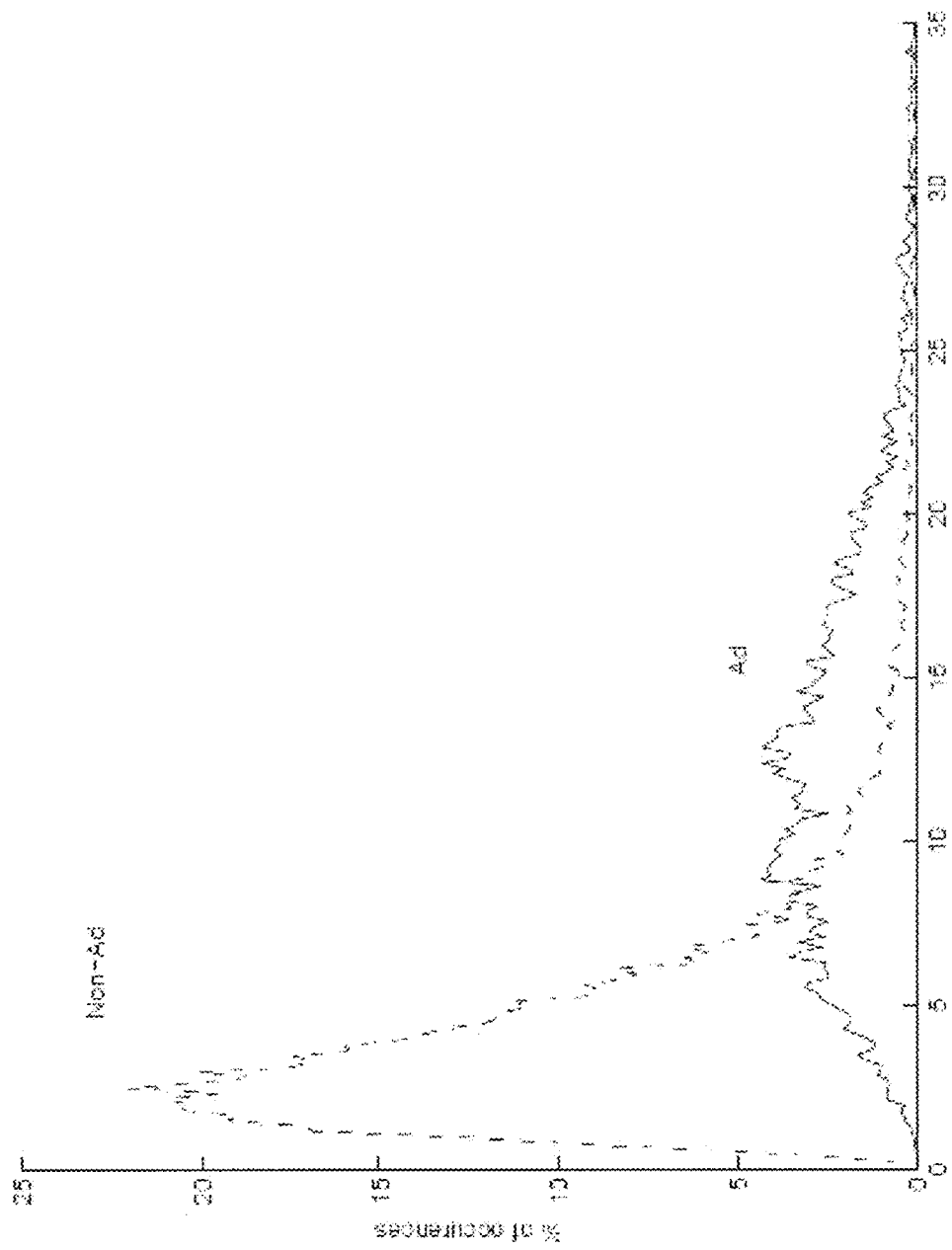
FIG. 8 is a graph of an exemplary distribution of pitch dynamics for advertisements and for conversational speech.

In an exemplary and non-limiting test embodiment of the present application, a plurality of audio streams were analyzed and filtered according to the exemplary embodiment. The audio streams consisted of recorded customer service calls, whose duration ranged from five to twenty minutes. Five such calls were drawn uniformly at random for each of twenty consecutive business days, for a total of one hundred calls. Each of the advertisements in each call was annotated using Praat audio annotation software. Those skilled in the art appreciate that additional, or alternative, annotation software may also be used. FIG. 8 compares the distributions of pitch dynamics for the advertisements versus all other speech in these calls.

The customer service calls were filtered according to the exemplary embodiment of the present application as described above, and the results of the filtering were compared to a baseline method. Under the baseline method, a two-state ergodic hidden Markov model (HMM) that ranges over acoustic features was used to detect and filter the advertisements from the customer service calls. One state of the HMM represents advertisements and the other state represents everything else. In principle, any aspect of the observable data can be viewed as the HMM's output. In the baseline method, the standard 39 mel-frequency cepstral coefficients (MFCCs) from 100 ms frames were used. In the baseline method, the 100 ms frame length seemed to produce more stable results than the more common 10 ms frame length. The HMM was trained using the Forward-Backward algorithm, and applied to test data using the Viterbi algorithm.

The test embodiment of the present application was compared with the baseline method by training each method on eighty calls and testing each method on the remaining twenty calls. For each method, and for each test call, the total length of the overlaps between the hypothesized advertisement snippets and the manually-annotated advertisements was computed. Then, this length was divided by the total length of all hypothesized advertisements in the call or by the total length of all manually-annotated advertisements in the call, to get precision or recall, respectively. Next, the harmonic mean of precision and recall were computed to arrive at the $F_1$ measure. Finally, the $F_1$ over the twenty calls in the test set was macro-averaged. The entire procedure was repeated five times, each time using a different eighty/twenty split into training and test sets, so that each call appeared in a test set exactly once.

FIG. 9 shows the mean $F_1$, as well as the mean precision and recall, for both methods. Based on the $F_1$ measure, the test embodiment of the present application, based on pitch dynamics, is almost twice as accurate as the baseline method. The differences between the two methods are statistically significant at p=0:01 using the t-test for paired samples. Accordingly, as shown in FIG. 9, the accuracy of the test embodiment of the present application is much higher than that of the baseline HMM method. In the test embodiment, it was more important to filter advertisements than to avoid not filtering non-ads, i.e., recall was more important than precision. By optimizing a skewed measure like $F_5$ instead of $F_1$, the test embodiment was able to raise recall to a satisfactory level.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, an exemplary embodiment of the present application has been described in which audio advertisements are filtered from an audio data stream. However, those skilled in the art appreciate that in alternative embodiments of the present application video advertisements may be filtered from a video data stream. Moreover, audio advertisements have generally been described as being filtered from the audio data stream based upon pitch dynamics. In this regard, those skilled in the art appreciate that the advertisements could be filtered based upon additional and/or alternative acoustic parameters, such as, but not limited to, emphasis, stress, amplitude, tone, and accent. Additionally, those skilled in the art further appreciate that the present application is not limited to filtering advertisements from a data stream but may be applied to filter any extraneous or unwanted data stream segment from a data stream.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for filtering a data stream, the method comprising:
   partitioning the data stream into a plurality of data stream segments;
   measuring an acoustic parameter in each of the plurality of data stream segments, the acoustic parameter being pitch;
   computing, for each of the plurality of data stream segments, variances of the pitch;
   determining, with a processor and for each of the plurality of data stream segments, whether each of the variances exceeds a predetermined variance threshold;
   determining, with the processor and for each of the plurality of data stream segments, whether a first predetermined condition is satisfied, the first predetermined condition including a frequency or a number of the variances, in which the pitch is varied in excess of the predetermined variance threshold, exceeding a predetermined frequency or a predetermined number threshold;
   identifying an extraneous portion of the data stream in which the first predetermined condition is satisfied;
   determining whether the extraneous portion satisfies a second predetermined condition in the data stream; and
   deleting the extraneous portion from the data stream to produce a filtered data stream in response to determining the second predetermined condition is satisfied.

2. The method as set forth in claim 1, wherein the extraneous portion is a single data stream segment in which the first predetermined condition is satisfied.

3. The method as set forth in claim 1, wherein the extraneous portion comprises a plurality of consecutive data stream segments in which the first predetermined condition is satisfied.

4. The method as set forth in claim 3, wherein each of the plurality of data stream segments has a fixed duration.

5. The method as set forth in claim 1, wherein the second predetermined condition includes a duration of the extraneous portion exceeding a minimum duration.

6. The method as set forth in claim 1, wherein the second predetermined condition includes a duration of an adjacent non-extraneous portion in which the first predetermined condition is not satisfied being less than a minimum duration.

7. The method as set forth in claim 1, wherein the second predetermined condition includes the extraneous portion being separated from another extraneous portion of the data stream by a non-extraneous portion in which the first predetermined condition is not satisfied.

8. The method as set forth in claim 7, wherein the second predetermined condition further includes the non-extraneous portion having a duration that is less than a minimum duration.

9. The method as set forth in claim 8, further comprising:
   deleting the non-extraneous portion in response to the non-extraneous portion having the duration less than the minimum duration.

10. The method as set forth in claim 1, wherein the second predetermined condition includes the extraneous portion not being determined to be an erroneous extraneous portion.

11. The method as set forth in claim 10, further comprising:
   determining whether the extraneous portion is the erroneous extraneous portion,
   wherein the determining whether the extraneous portion is the erroneous extraneous portion includes determining whether the extraneous portion is separated from another extraneous portion by a non-extraneous portion in which the first predetermined condition is not satisfied.

12. The method as set forth in claim 11, wherein the determining whether the extraneous portion is the erroneous extraneous portion further includes determining whether a duration of the extraneous portion is shorter than a duration of the other extraneous portion.

13. The method as set forth in claim 12, wherein the extraneous portion is determined to be the erroneous extraneous portion when the duration of the extraneous portion is shorter than the duration of the other extraneous portion.

14. The method as set forth in claim 13, further comprising:
   deleting the other extraneous portion from the data stream.

15. The method as set forth in claim 1, wherein the second predetermined condition includes determining whether a duration of the extraneous portion is not shorter than another extraneous portion.

16. The method as set forth in claim 15, wherein the second predetermined condition further includes determining whether the extraneous portion is separated from the other extraneous portion by a non-extraneous portion in which the first predetermined condition is not satisfied.

17. The method as set forth in claim 1, further comprising:
   replacing the extraneous portion which is deleted from the data stream with an alternative portion.

18. The method as set forth in claim 1, wherein the extraneous portion is an advertisement in the data stream.

19. An apparatus for filtering a data stream, the apparatus comprising:
   a processor; and
   a memory storing instructions that, when executed by the processor, cause the processor to perform operations including:
      partitioning the data stream into a plurality of data stream segments;
      measuring an acoustic parameter in each of the plurality of data stream segments, the acoustic parameter being pitch;
      computing, for each of the plurality of data stream segments, variances of the pitch;
      determining, for each of the plurality of data stream segments, whether each of the variances exceeds a predetermined variance threshold;
      determining, for each of the plurality of data stream segments, whether a first predetermined condition is satisfied, the first predetermined condition including a frequency or a number of the variances, in which the pitch is varied in excess of the predetermined variance threshold, exceeding a predetermined frequency or a predetermined number threshold;

identifying an extraneous portion of the data stream in which the first predetermined condition is satisfied;

determining whether the extraneous portion satisfies a second predetermined condition in the data stream; and deleting the extraneous portion from the data stream to produce a filtered data stream in response to determining the second predetermined condition is satisfied.

20. A non-transitory computer-readable medium having an executable computer program for filtering a data stream that, when executed by a processor, causes the processor to perform operations comprising:

partitioning the data stream into a plurality of data stream segments;

measuring an acoustic parameter in each of the plurality of data stream segments, the acoustic parameter being pitch;

computing, for each of the plurality of data stream segments, variances of the pitch;

determining, for each of the plurality of data stream segments, whether each of the variances exceeds a predetermined variance threshold;

determining, for each of the plurality of data stream segments, whether a first predetermined condition is satisfied, the first predetermined condition including a frequency or a number of the variances, in which the pitch is varied in excess of the predetermined variance threshold, exceeding a predetermined frequency or a predetermined number threshold;

identifying an extraneous portion of the data stream in which the first predetermined condition is satisfied;

determining whether the extraneous portion satisfies a second predetermined condition in the data stream; and deleting the extraneous portion from the data stream to produce a filtered data stream in response to determining the second predetermined condition is satisfied.

* * * * *